United States Patent
Lim et al.

(10) Patent No.: US 9,037,292 B2
(45) Date of Patent: May 19, 2015

(54) ROBOT AND CONTROL METHOD OF OPTIMIZING ROBOT MOTION PERFORMANCE THEREOF

(75) Inventors: Bok Man Lim, Seoul (KR); Kyung Shik Roh, Seongnam-si (KR); San Lim, Suwon-si (KR); Myung Hee Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 899 days.

(21) Appl. No.: 12/926,078

(22) Filed: Oct. 25, 2010

(65) Prior Publication Data

US 2011/0106303 A1    May 5, 2011

(30) Foreign Application Priority Data

Oct. 30, 2009   (KR) .................. 10-2009-0104625

(51) Int. Cl.
*G06F 19/00*   (2011.01)
*B62D 57/032*   (2006.01)

(52) U.S. Cl.
CPC .................................. *B62D 57/032* (2013.01)

(58) Field of Classification Search
USPC ......... 700/245, 250, 253, 257, 260, 261, 263;
318/568.12, 568.17, 568.18, 568.2, 318/568.22
See application file for complete search history.

(56) References Cited

U.S. PATENT DOCUMENTS

| | | | | |
|---|---|---|---|---|
| 4,829,219 A | * | 5/1989 | Penkar | 318/568.18 |
| 4,990,838 A | * | 2/1991 | Kawato et al. | 700/246 |
| 5,499,320 A | * | 3/1996 | Backes et al. | 700/260 |
| 5,719,480 A | * | 2/1998 | Bock et al. | 318/568.11 |
| 8,350,861 B2 | * | 1/2013 | Lee et al. | 345/474 |
| 2001/0016157 A1 | * | 8/2001 | Sundar | 414/217 |
| 2003/0108415 A1 | * | 6/2003 | Hosek et al. | 414/783 |
| 2008/0058987 A1 | * | 3/2008 | Ozick et al. | 700/250 |
| 2009/0005906 A1 | * | 1/2009 | Tajima | 700/245 |
| 2009/0069940 A1 | * | 3/2009 | Honda et al. | 700/258 |
| 2009/0069941 A1 | * | 3/2009 | Honda et al. | 700/258 |
| 2010/0017028 A1 | * | 1/2010 | Suga et al. | 700/245 |
| 2010/0057255 A1 | * | 3/2010 | Ra et al. | 700/253 |
| 2010/0113980 A1 | * | 5/2010 | Herr et al. | 600/587 |

OTHER PUBLICATIONS

Seki et al., Minimum Jerk Control of Power Assisting Robot Based on Human Arm Behavior Characteristic, 2004 IEEE International Conference on Systems, Man and Cybernetics, pp. 722-727.*

Ning Lan, Analysis of an optimal control model of multi-joint arm movements, 1997 Biological Cybernetics, Springer-Verlag, pp. 107-117.*

(Continued)

*Primary Examiner* — Khoi Tran
*Assistant Examiner* — Jaime Figueroa
(74) *Attorney, Agent, or Firm* — Harness, Dickey & Pierce, P.L.C.

(57) ABSTRACT

A robot and a method of controlling the same are disclosed. The robot derives a maximum dynamic performance capability using a specification of an actuator of the robot. The control method includes forming a first bell-shaped velocity profile in response to a start time and an end time of a motion of the robot, calculating a value of an objective function having a limited condition according to the bell-shaped velocity profile, and driving a joint in response to a second bell-shaped velocity profile that minimizes the objective function having the limited condition.

20 Claims, 10 Drawing Sheets

(56) References Cited

OTHER PUBLICATIONS

Nagengast et al., Optimal Control Predicts Human Performance on Objects with Internal Degrees of Freedom, 2009, PLoS Computational Biology vol. 5( Issue 6): e1000419. doi:10.1371/journal.pcbi.1000419, pp. 1-15.*

Degallier et al., Toward simple control for complex autonomous robotic applications- combining discrete and rhythmic motor primitives, 2011, Auton Robot, Springer Science+Business Media, LLC 2011, pp. 156-181.*

Atkeson et al., Kinematic Features of Unrestrained Vertical Arm Movements, 1985, The journal of neuroscience, vol. 5, No. 9, pp. 2318-2330.*

Friedmann et al., Versatile, high-quality motions and behavior control of humanoid soccer robots, 2006, proceedings of the Workshop on Humanoid Soccer Robots of the 2006 IEEE-RAS International Conference on Humanoid Robots, Genoa, Italy, Dec. 2006, pp. 9-16.*

Iocchi et al., Learning humanoid soccer actions interleaving simulated and real data, 2008, 2nd Workshop on Humanoid Soccer Robots, The University of Padua Intelligent Autonomous System Lab (IAS-Lab), pp. 1-4.*

Stelzer et al., Walking, Running and Kicking of Humanoid Robots and Humans, 2008, Springer, From book Nano to Space , pp. 175-192.*

* cited by examiner

ROBOT AND CONTROL METHOD OF OPTIMIZING ROBOT MOTION PERFORMANCE THEREOF

CROSS-REFERENCE TO RELATED APPLICATIONS

This application claims the priority benefit of Korean Patent Application No. 10-2009-0104625, filed on Oct. 30, 2009 in the Korean Intellectual Property Office, the disclosure of which is incorporated herein by reference.

BACKGROUND

1. Field

Embodiments relate to a robot to derive a maximum dynamic performance of a humanoid robot, and a method of controlling the same.

2. Description of the Related Art

In general, a mechanical device which performs motions similar to human motions using an electrical or magnetic mechanism is called a robot. The word 'Robot' is derived from the Slavak word 'robota' (slave machine). Most early robots served as manipulators used for automated or unmanned tasks of manufacturing plants or industrial robots, such as transportation robots.

Recently, research into a walking robot made through imitation of the mechanics and operations of animals walking straight with two legs, such as human beings or monkeys, has been actively conducted, such that the walking robot can be put to practical use. The bipedal straight walking of the robot is more unstable than a crawler walking type or a 4-legged or 6-legged walking type, and is more difficult than the crawler walking type or the 4-legged or 6-legged walking type in terms of posture- or walking- control. Therefore, the robot can smoothly walk on uneven ground or an uneven surface having an obstacle in a walking path, or can easily cope with a discontinuous walking mode based on the presence of stairs or ladders, such that the robot can smoothly move on the walking path.

Generally, a representative walking robot made in imitation of the bionic mechanism and operations of a human being is called a humanoid robot. The humanoid robot can support human lives, residential living services, and human activity in other daily lives.

The purposes of researching and developing the humanoid robot can be classified into two purposes, i.e., the implementation of human science and the support of human activity.

A detailed description of the implementation of human science is as follows. Such a robot capable of moving its legs, arms, and hands like a human being has been manufactured, and a method of controlling the robot has been developed, such that the walking motion of the human being can be simulated by the robot and the control method thereof. By the simulation process, the mechanism of the walking motion and natural operations of the human being can be technically explained. These research results can largely contribute to human engineering, rehabilitation engineering, or sports science, and other engineering fields related to human mechanics.

A detailed description of such support of human activity is as follows. Support of human activity aims to develop a robot that supports various human activities, e.g., residential living services and other human activities in the course of daily life. Such a robot must learn various aspects of human living environments from the human being, and must also learn an adaptation method for either persons having different personalities or environments having different characteristics, so that it is necessary for the robot to be further developed. In this case, if the robot is manufactured to have a humanoid appearance, the human can freely and easily talk to the humanoid robot with a feeling of intimacy.

In the meantime, in order to allow the humanoid robot to interact with humans, it is necessary to carry out dynamic motion (e.g., a motion of kicking or throwing a ball). However, it is difficult for the humanoid robot to perform a rapid and dynamic motion similar to a human motion. The rapid and dynamic motion, e.g., a throw motion and a kick motion, is achieved through repeated practice and learning over a long period of time. In more detail, a person cannot effectively handle the degree of freedom composed of many joints, and all joints are effectively and harmonically controlled, so that the optimization of a specific physical range can be achieved. From the viewpoint of control, it can be seen that a slow motion initially carried out by a feedback action of a sensor is being evolved to a pre-optimized motion formed through learning. The motion optimization achieved by the specific objective function may be considered to be a process of achieving the learning over a long period of time within a short period of time. Optimizing the human motion in response to individual objects is being supported by considerable research into bionics. Therefore, in order to allow the robot to perform dynamic motion, it is necessary for the robot to receive an optimum motion command in response to dynamics and mechanics of the robot.

SUMMARY

Therefore, it is an aspect of at least one embodiment to provide a robot to derive a maximum dynamic performance capability using a specification and dynamics of an actuator of the robot, and a method for controlling the same.

Additional aspects of at least one embodiment will be set forth in part in the description which follows and, in part, will be obvious from the description, or may be learned by practice of the invention.

The foregoing and/or other aspects are achieved by providing a method of controlling a robot, the method including forming a first bell-shaped velocity profile in response to a start time and an end time of a motion of the robot, calculating a value of an objective function having a limited condition according to the first bell-shaped velocity profile, and driving a joint of the robot in response to a second bell-shaped velocity profile that minimizes the objective function having the limited condition.

The forming of the first bell-shaped velocity profile in response to the start time and the end time of the motion may include forming a trajectory of either a joint needed for motion of the robot or a center of gravity of the robot.

The trajectory may include information of a joint angle, a joint velocity, and a joint acceleration needed to perform the motion.

The objective function having the limited condition may recognize a value ($J_{min}$) using the following Equation:

$$\min_{P_{CoG},q} (-w_1 J_{performance} + w_2 J_{velocity} + w_3 J_{torque} + w_4 J_{balance}) = J_{min} \quad \text{[Equation]}$$

where $J_{performance}$ is a value of an objective function to maximize a velocity of an end effector of the robot, $J_{velocity}$ is a value of an objective function to limit a velocity of a joint used in the motion, $J_{torque}$ is a value of an objective function to limit a torque of the joint, $J_{balance}$ is a value of an objective function to limit a Zero Momentum Point (ZMP) of the robot within a specific range, $w_1$, $w_2$, $w_3$, or $w_4$ is a constant, PCoG is a position of an overall center of gravity of the robot, and q is an angle of the joint.

The bell-shaped velocity profile may represent a variation of velocity with time.

The forming of the first bell-shaped velocity profile in response to the start time and the end time of the motion may include forming a plurality of initial bell-shaped velocity profiles in response to a certain start time and a certain end time of the motion.

The calculating of the value of the objective function having the limited condition according to the first bell-shaped velocity profile may include repeatedly recognizing the value of the objective function having the limited condition in response to the initial bell-shaped velocity profiles.

The foregoing and/or other aspects are achieved by providing a robot including an input unit to receive a motion command of a robot, and a controller to form a first bell-shaped velocity profile in response to a start time and an end time of a motion of the robot, to calculate a value of an objective function having a limited condition according to the first bell-shaped velocity profile, and to drive a joint in response to a specific second bell-shaped velocity profile that minimizes the objective function having the limited condition.

The controller may form a trajectory of either a joint needed for motion of the robot or a center of gravity of the robot.

The controller may recognize a value ($J_{min}$) of the objective function having the limited condition using the following Equation:

$$\min_{P_{CoG}, q} (-w_1 J_{performance} + w_2 J_{velocity} + w_3 J_{torque} + w_4 J_{balance}) = J_{min} \quad \text{[Equation]}$$

where $J_{performance}$ is a value of an objective function to maximize a velocity of an end effector of the robot, $J_{velocity}$ is a value of an objective function to limit a velocity of a joint used in the motion, $J_{torque}$ is a value of an objective function to limit a torque of the joint, $J_{balance}$ value of an objective function to limit a Zero Momentum Point (ZMP) of the robot within a specific range, $w_1$, $w_2$, $w_3$, or $w_4$ is a constant, PCoG is a position of an overall center of gravity of the robot, and q is an angle of the joint.

The controller may form a plurality of initial bell-shaped velocity profiles in response to a certain start time and a certain end time of a motion.

The controller may recognize the value of the objective function having the limited condition according to the initial bell-shaped velocity profiles, and drive a joint in response to a specific second bell-shaped velocity profile that minimizes the value of the objective function.

The controller may drive each joint or a center of gravity needed for the motion in response to a second bell-shaped velocity profile that minimizes the value of the objective function.

The controller may arbitrarily determine the start time and the end time of the motion, and form a bell-shaped profile of either a joint needed for the motion or the center of gravity.

The foregoing and/or other aspects are achieved by providing a method of controlling a robot, including: forming a first velocity profile of a joint of the robot in response to an initial start time and an initial end time of a motion; calculating a value of an objective function having a limited condition according to the first velocity profile; determining whether a convergence condition of a routine of calculating the objection function is satisfied; determining a new start time and a new end time of the motion which causes the objective function having the limited condition to be minimized when the convergence condition is satisfied; forming a second velocity profile of the joint of the robot based on the new start and end times of the motion; and driving the joint in response to the second velocity profile that minimizes the objection function having the limited condition.

The forming of the first velocity profile in response to the initial start and end times may include forming a trajectory of either the joint used for motion of the robot or a center of gravity of the robot.

The trajectory may include information of an angle, a velocity, and an acceleration of the joint used to perform the motion.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
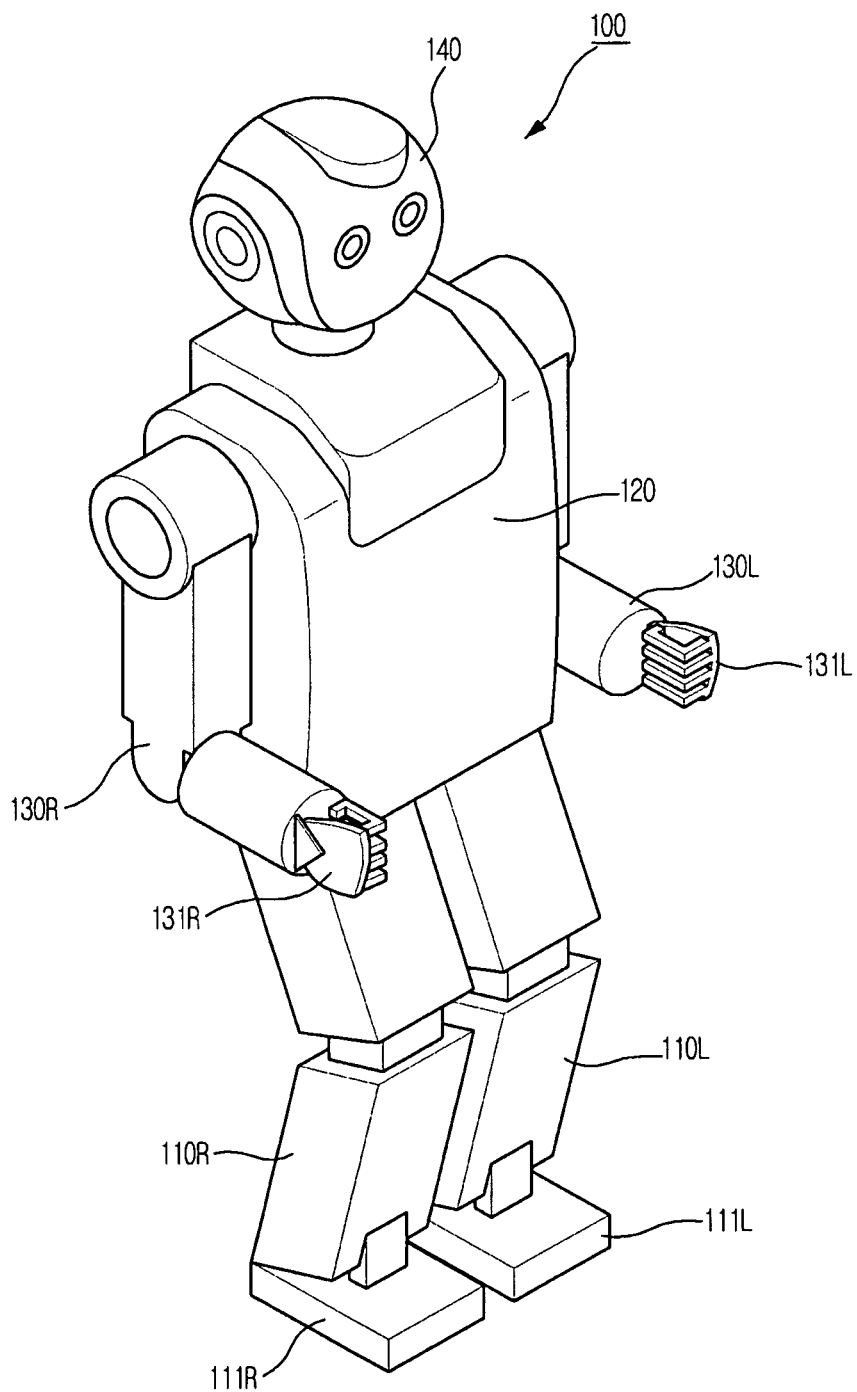
FIG. 1 is an appearance view illustrating an example of a robot according to at least one embodiment.

Reference will now be made in detail to the at least one embodiment, examples of which are illustrated in the accompanying drawings, wherein like reference numerals refer to like elements throughout.

FIG. 1 is an appearance view illustrating an example of a robot according to at least one embodiment.

In FIG. 1, the robot 100 according to at least one embodiment is a bipedal robot which walks erect using two legs 110R and 110L similar to a human, and includes a trunk 120, two arms 130R and 130L and a head 140 mounted on an upper side of the trunk 120, and feet 111R and 111L and hands 131R and 131L respectively mounted on the front ends of the two legs 110R and 110L and the arms 130R and 130L.

In the reference numerals, R and L denote right and left of the robot 100, respectively.

Figure 2:
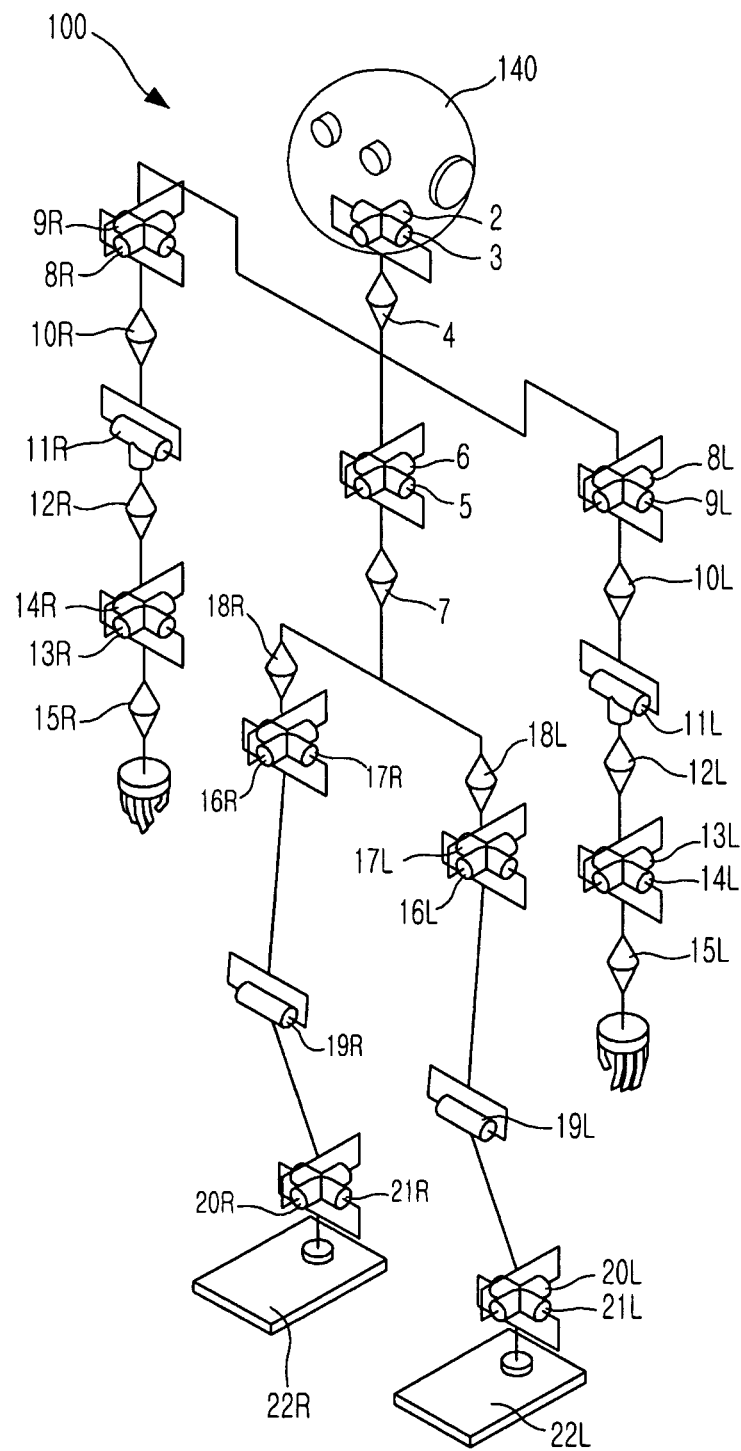
FIG. 2 is a view illustrating the structure of the main joints of the robot shown in FIG. 1.

FIG. 2 is a view illustrating the structure of the main joints of the robot shown in FIG. 1.

In FIG. 2, a neck joint to support the head 140 includes a neck joint roll axis 2, a neck joint pitch axis 3, and a neck joint yaw axis 4, so that the neck joint may move in an x-axis (roll axis), a y-axis (pitch axis) and a z-axis (yaw axis) direction.

Each of two arms 130R and 130L includes a shoulder joint, an elbow joint, and a wrist joint such that the portions corresponding to the shoulders, the elbows and wrists of the robot 100 rotate. The shoulder joints of the arms 130R and 130L respectively include shoulder joint roll axes 8R and 8L, shoulder joint pitch axes 9R and 9L, shoulder joint yaw axes 10R and 10L, so that each shoulder joint may move in an x-axis (roll axis), a y-axis (pitch axis) and a z-axis (yaw axis) direction.

The elbow joints of the two arms 130R and 130L respectively include elbow joint pitch axes 11R and 11L and elbow joint yaw axes 12R and 12L, so that each elbow joint may move in the y-axis (pitch axis) and the z-axis (yaw axis) directions.

The wrist joints of the two arms 130R and 130L respectively include wrist joint roll axes 13R and 13L, wrist joint pitch axes 14R and 14L and wrist joint yaw axes 15R and 15L, so that each wrist joint may move in the x-axis (roll axis), the y-axis (pitch axis) and the z-axis (yaw axis) directions.

The trunk 120 includes a trunk roll axis 6, a trunk pitch axis 5, and a trunk yaw axis 7, so that it can move in the x-axis (roll axis), the y-axis (pitch axis) and the z-axis (yaw axis) directions.

Two legs 110R and 110L respectively include leg joint roll axes 16R and 16L, leg joint pitch axes 17R and 17L, and leg joint yaw axes 18R and 18L, so that each leg 110R or 110L can move in the x-axis (roll axis), the y-axis (pitch axis) and the z-axis (yaw axis) directions. The two legs 110R and 110L respectively include knee joint pitch axes 19R and 19L so that each leg 110R or 110L can move in the y-axis (pitch axis) direction. The two legs 110R and 110L respectively include ankle joint roll axes 20R and 20L and ankle joint pitch axes 21R and 21L, so that each leg 110R or 110L can move in the x-axis (roll axis) and the y-axis (pitch axis) directions. The feet may be represented by base 22R and 22L.

Meanwhile, each degree of freedom that the humanoid robot 100 has is actually determined using an actuator. Other expansion is excluded in the robot appearance to enable the robot appearance to approximate the appearance of a human, and an actuator may be configured as a small-sized and lightweight structure to control the posture of an unstable structure.

Figure 3:
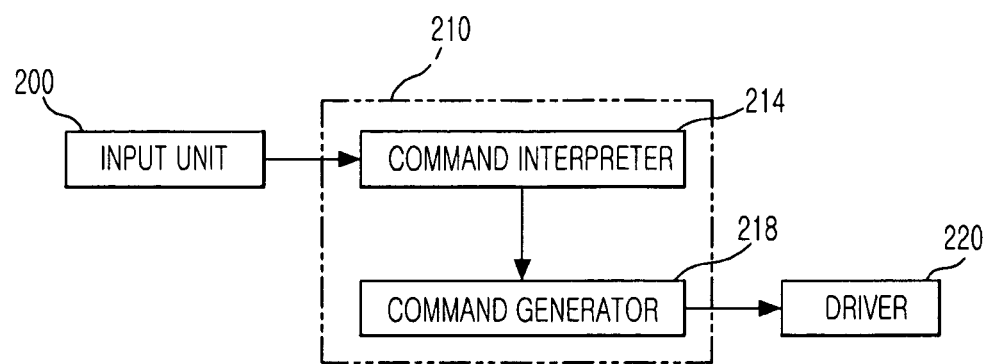
FIG. 3 is a control block diagram illustrating a robot according to at least one embodiment.

FIG. 3 is a control block diagram illustrating a robot according to at least one embodiment.

In FIG. 3, the robot 100 includes an input unit 200 to receive a motion command, etc. from a user, a controller 210 including a command interpreter 214 to interpret the received motion command and to generate an intermediate path plan between a start point and an end point of a robot joint trajectory, and a command generator 218 connected to the command interpreter 214 so as to generate a motion command, and a driver 220 to drive each joint of the robot 100 under the control of the controller 210.

If a start posture and an end posture of the robot motion (e.g., a motion of kicking or throwing a ball) are given, the controller 210 optimizes a joint trajectory to cause the end effector (e.g., fingertip and toe) to have a maximum velocity. An angle, velocity, and acceleration of each joint are optimized in such a manner that the end effector has a maximum velocity for optimization of the joint trajectory. For these purposes, the controller 210 can be operated as follows.

First, if the start time and the end time of the motion are arbitrarily given, the controller 210 forms a trajectory of each joint and a Center of Gravity (CoG) according to the start time and the end time of the motion. If the trajectory is formed, the controller 210 can extract the angle, velocity, and acceleration of the joint of the robot 100 with time, and the robot 100 can perform a motion according to the extracted angle, velocity, and acceleration of each joint. Meanwhile, the controller 210 uses a bell-shaped velocity profile (also called a bell-type velocity profile) as a velocity profile in a working space or a joint space, and determines an optimum control timing point of each joint by applying the velocity profile of each joint to the start time and the end time. The bell-shaped velocity profile may configure the shape of a profile in the form of a bell such that it can indicate a variation of velocity with time. Formation of the trajectory will be described later with reference to FIGS. 4A and 4B.

Second, in order to maximize the velocity of the end effector during the motion of the robot, the controller 210 may extract a minimum value ($J_{min}$) of an objective function having a limited condition using the following Equation 1.

$$\min_{P_{CoG},q} (-w_1 J_{performance} + w_2 J_{velocity} + w_3 J_{torque} + w_4 J_{balance}) = J_{min}$$ [Equation 1]

Unknown quantities of Equation 1 will hereinafter be described.

In Equation 1, $w_1$, , $w_2$, $w_3$, or $w_4$ is a constant, and $J_{performance}$ is a value of an objective function to maximize the velocity profile of the end effector.

$$J_{performance} = V_{End\_x,max\ hu\ 2} + cV_{End\_z,max}^2 - V_{End\_y,max}^2$$ [Equation 2]

In Equation 2, $V_{End\_x,max}$ is a maximum velocity in the x-axis direction of the end effector, $V_{End\_y,max}$ is a maximum velocity in the y-axis direction of the end effector, $V_{End\_z,max}$ is a maximum velocity in the z-axis direction, and 'c' is a constant to decide the height of the motion direction. Meanwhile, each maximum velocity of x, y, and z axes of each joint to calculate $J_{performance}$ can be recognized according to the velocity trajectory formed with time, such that $J_{performance}$ can be calculated by Equation 2.

$J_{velocity}$ is a value of an objective function to limit the velocity of each joint, and can be calculated by the following Equation 3.

$$J_{velocity} = \sum_{t_{initial}}^{t_{final}} (\dot{q} - \dot{q})^T W_1 (\dot{q} - \dot{q}) + (\dot{q} - \bar{\dot{q}})^T W_1 (\dot{q} - \bar{\dot{q}})$$ [Equation 3]

In Equation 3, $\dot{q}$ is an angle of each joint and a CoG of the robot 100 needed for the motion, $\underline{\dot{q}}$ is the lowest value of the angle of each joint and CoG of the robot 100, and $\bar{\dot{q}}$ is the highest value of the angle of each joint and CoG of the robot 100. In this case, the lowest value and the highest value of the angle of each joint and CoG of the robot 100 respectively refer to a lowest threshold value and a highest threshold value of the angle by which the joint of the robot 100 can rotate according to the specification of the actuator of the robot 100. In the meantime, T is a transpose of a matrix, $W_1$ is a constant, $t_{initial}$ is the start time of the motion, and $t_{final}$ is the end time of the motion.

$J_{torque}$ is an objective function to limit a joint torque, and can be calculated by the following Equation 4.

$$J_{torque} = \sum_{t_{initial}}^{t_{final}} (\underline{\tau} - \tau)^T W_2 (\underline{\tau} - \tau) + (\tau - \overline{\tau})^T W_2 (\tau - \overline{\tau})$$ [Equation 4]

In Equation 3, τ is a torque of each joint and CoG needed for the robot motion, $\overline{\tau}$ is the highest torque value of each joint and CoG according to the specification of the actuator of the robot 100, $\underline{\tau}$ is the lowest torque value of each joint and CoG, $W_2$ is a constant, $t_{initial}$ is the start time of the motion, and $t_{final}$ is the end time of the motion. In addition, torque value can be calculated by the following Equation 5 showing the well-known inverse dynamics.

$$\tau = ID(V_{base}, q, \dot{q}, \ddot{q})$$ [Equation 5]

In Equation 5, q, $\dot{q}$, and $\ddot{q}$ may be extracted from the trajectory formed in response to the start time and the end time of the motion, and respectively refer to the angle, the velocity, and the acceleration of each joint and the CoG of the robot. $V_{base}$ is the hip velocity of the robot 100, and can be calculated by the following Equation 6.

$$\begin{bmatrix} L \\ P \end{bmatrix} \equiv I_c + V_{base} \cdot H\dot{q}$$ [Equation 6]

In Equation 6, L and P respectively refer to a rotational momentum and a linear momentum, and can be calculated by $P_{CoG}$ of the robot, $I_c$, is an entire inertial matrix of the robot 100 and can be determined by the controller 210, H is an inertial matrix to indicate the relationship between the joint space and the momentum, and $\dot{q}$ is the velocity of the joint. In this case, $P_{CoG}$ and $\dot{q}$ can be calculated by the velocity trajectory formed with time, so that $V_{base}$ can be calculated by Equation 6.

$J_{balance}$ is a value of an objective function to limit a Zero Momentum Point (ZMP) of the robot within a specific range, and can be calculated by the following Equation 7.

$$J_{balance} = \sum_{t_{initial}}^{t_{final}} (\underline{p}_{zmp} - p_{zmp})^T W_3 (\underline{p}_{zmp} - p_{zmp}) + (P_{zmp} - \overline{p}_{zmp})^T W_3 (P_{zmp} - \overline{p}_{zmp})$$ [Equation 7]

In Equation 7, $P_{zmp}$ is a zero momentum point (ZMP), $\overline{p}_{zmp}$, and $\underline{p}_{zmp}$ respectively refer to the highest ZMP value and the lowest ZMP value. In the meantime, $p_{zmp}$ can be calculated by the following Equations 8 to 10.

$$p_{zmp} = \begin{bmatrix} ZMP_x \\ ZMP_y \end{bmatrix}$$ [Equation 8]

$$ZMP_x = \frac{Mgc_x + (p_z - c_z)\dot{P}_x - \dot{L}_y + c_x \dot{P}_z}{\dot{P}_z + Mg}$$ [Equation 9]

$$ZMP_y = \frac{Mgc_y + (p_z - c_z)\dot{P}_y - \dot{L}_x + c_y \dot{P}_z}{\dot{P}_z + Mg}$$ [Equation 10]

In Equations 8 to 10, M is an overall weight of the robot 100, g is acceleration of gravity, $c_x$, $c_y$ and $c_z$ respectively refer to x, y, and z components of the CoG (Center of Gravity), $P_x$, $P_y$ and $P_z$ respectively refer to x, y, and z components of the linear momentum, and $L_x$ and $L_y$ respectively refer to x and y components of the rotational momentum. $\dot{P}_x$, $\dot{P}_y$, and $\dot{P}_z$ respectively refer to differential values of x, y and z components of the linear momentum, and $\dot{L}_x$ and $\dot{L}_y$ respectively refer to differential values of x and y components.

The controller 210 calculates an objective function of Equation 1. If a convergence condition for optimization is satisfied, the controller 210 stops iteration of the optimization. In this case, if a variation of the value of the objective function is equal to or less than a predetermined value, the convergence condition of the optimum function is satisfied.

Figure 4A:
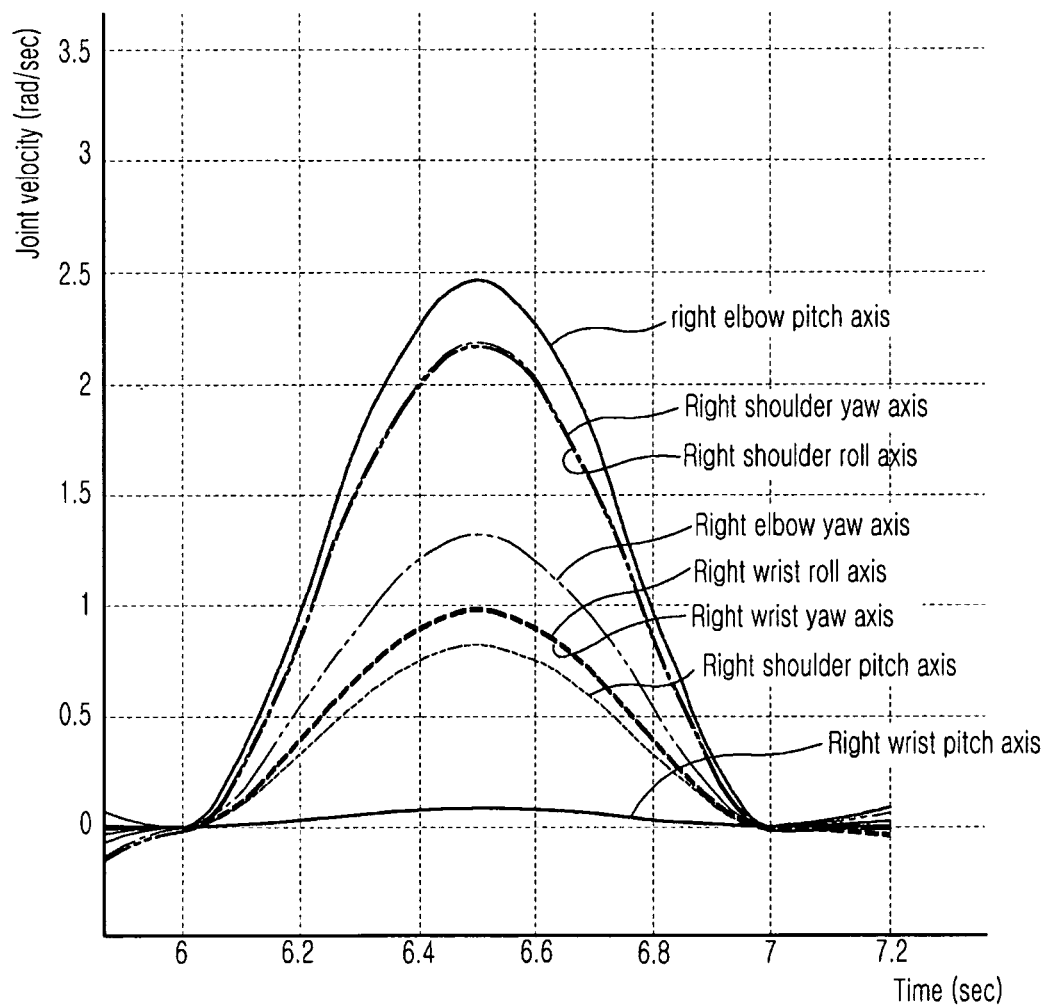
FIG. 4A is a bell-shaped graph illustrating a velocity profile of an arm joint before a robot motion is optimized according to at least one embodiment.
Figure 4B:
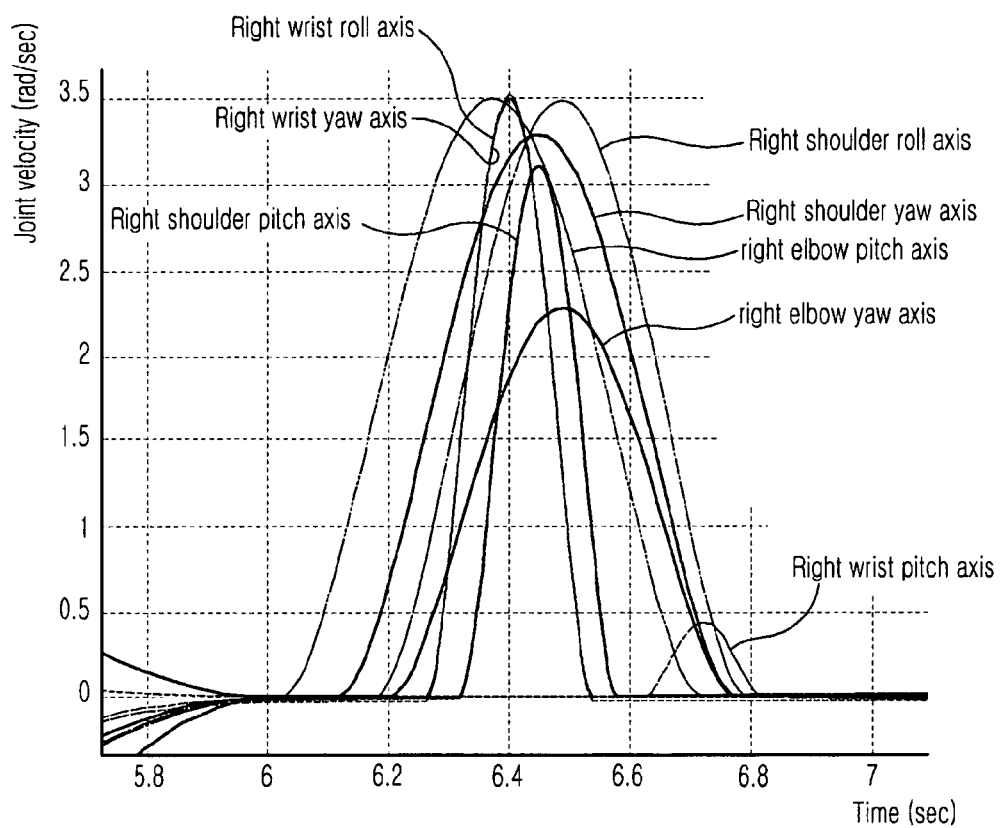
FIG. 4B is a bell-shaped graph illustrating a velocity profile of an arm joint after a robot motion is optimized according to at least one embodiment.

FIG. 4A is a bell-shaped graph illustrating a velocity profile of an arm joint before a robot motion is optimized according to at least one embodiment. FIG. 4B is a bell-shaped graph illustrating a velocity profile of an arm joint after a robot motion is optimized according to at least one embodiment.

In the case of the ball throwing motion of the robot 100, the roll axis 8R of the right shoulder joint of the robot 100, the shoulder joint pitch axis 9R, and the shoulder joint yaw axis 10R are used, the right elbow joint yaw axis 12R and the elbow joint pitch axis 11R are used, the wrist joint roll axis 13R, the wrist joint pitch axis 14R and the wrist joint yaw axis 15R are used, so that the robot 100 can throw the ball in a desired direction.

Referring to FIG. 4A, the controller 210 converts a velocity profile of each joint of arms needed for a throw motion into parameters indicating the start time and the end time of each motion, such that the velocity profile can be denoted by such parameters. FIG. 4A shows a velocity profile of an arm joint before the robot motion is optimized. As can be seen from FIG. 4A, it can be recognized that respective joints have the same start time and the same end time, and have different highest angles, different highest velocities and different highest accelerations. In the meantime, if a given function g'(t) for the bell-shaped velocity profile is differentiated, the function g"(t) of the velocity profile can be generated. If a given function of the velocity profile is integrated, a function g(t) of a profile related to a joint angle can be generated.

Referring to FIG. 4B, the controller 210 optimizes a velocity profile of each joint of arms needed for a throw motion, such that the controller 210 may convert the velocity profile into parameters indicating the start time and the end time of each motion. FIG. 4B shows an optimized velocity profile of each motion to acquire a maximum dynamic performance capability of the robot 100. When the robot 100 performs the throw motion, energy loss in the range from the shoulder joint to the end effector (i.e., fingertip) is minimized, and at the same time energy and momentum transfer are achieved, so that a maximum velocity can be obtained at the fingertip at an appropriate time.

Figure 5A:
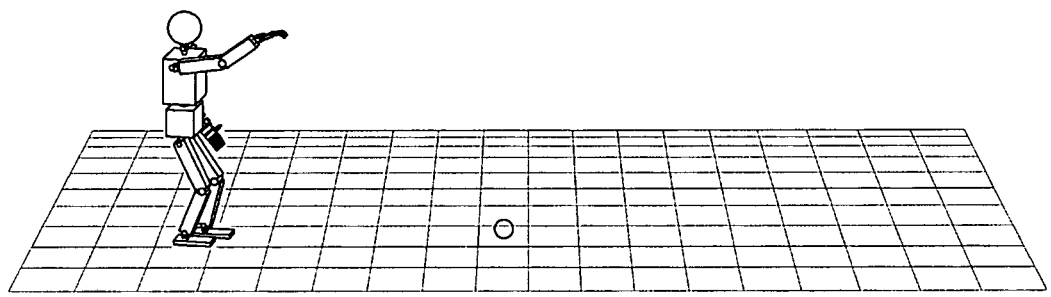
FIG. 5A shows a throw motion before an optimization technique is applied to a robot joint according to at least one embodiment.
Figure 5B:
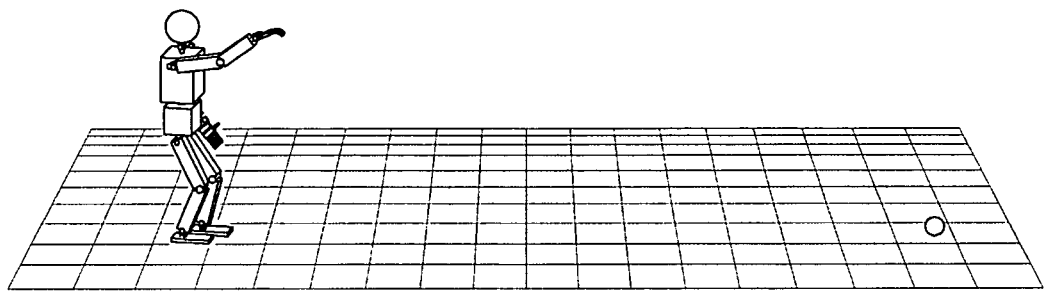
FIG. 5B shows a throw motion after an optimization technique is applied to a robot joint according to at least one embodiment.

FIG. 5A shows a throw motion before an optimization technique is applied to a robot joint according to at least one embodiment. FIG. 5B shows a throw motion after an optimization technique is applied to a robot joint according to at least one embodiment.

Referring to FIGS. 5A and 5B, if the joint control input timing for the robot 100 is optimized, the maximum dynamic performance capability of the robot 100 having a limited-sized actuator is derived so that the robot 100 can throw the ball farther.

Figure 6A:
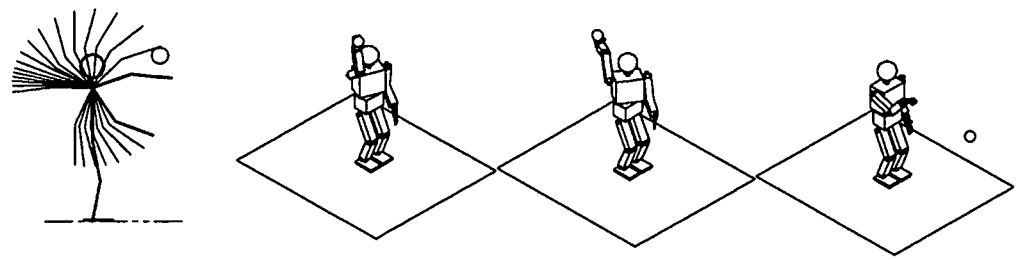
FIGS. 6A and 6B show optimized motion performance operations of the robot according to at least one embodiment.
Figure 6B:
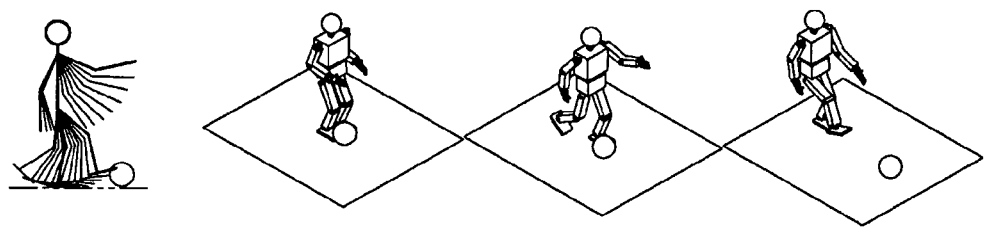

FIGS. 6A and 6B show optimized motion performance operations of the robot according to at least one embodiment.

Referring to FIG. 6A, in order to allow the robot 100 to throw a ball at a maximum velocity, it is necessary for the shoulder joints 8, 9 and 10, the elbow joints 11 and 12, and the wrist joints 13, 14 and 15 to sequentially move, so that the motor must be driven at an optimized timing point. If respective joints for the motion are sequentially driven according to the optimized trajectory, the energy loss in the range from the shoulder to the fingertip is minimized, and at the same time energy and momentum transfer are achieved, so that a maximum velocity can be obtained at the fingertip at an appropriate time.

Referring to FIG. 6B, in order to allow the robot 100 to kick a ball at a maximum velocity, it is necessary for the leg joints 16, 17 and 18, the knee joint 19, and the ankle joints 20 and 21 to sequentially move, so that the motor must be driven at an optimized timing point.

Figure 7:
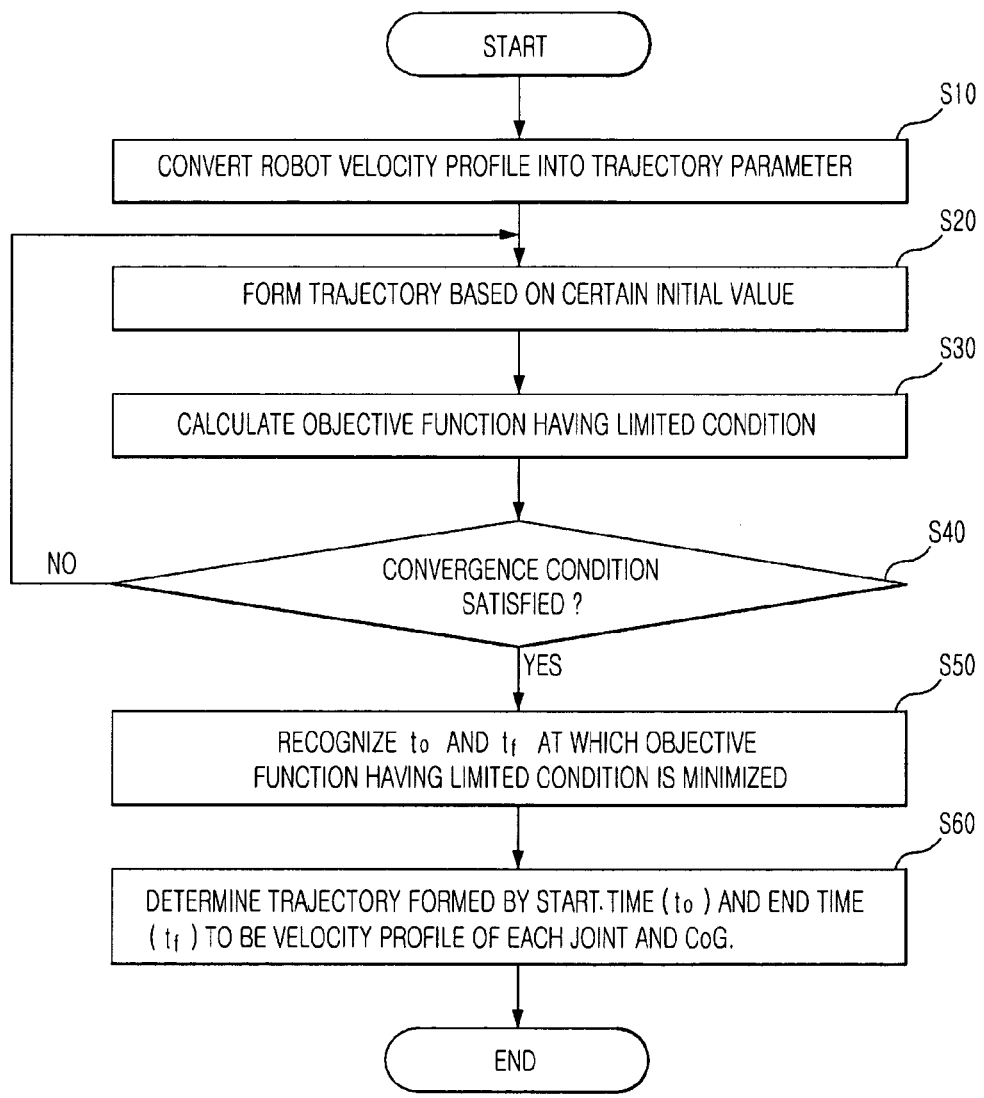
FIG. 7 is a flowchart illustrating a method of controlling a robot according to at least one embodiment.

FIG. 7 is a flowchart illustrating a method of controlling a robot according to at least one embodiment.

Referring to FIG. 7, the controller 210 converts a velocity profile of each joint needed for a motion and a CoG of the robot 100 into parameters indicating the start time and the end time at operation S10.

The controller 210 forms a trajectory based on a certain initial value. In other words, if the start time and the end time of the motion are arbitrarily established, the trajectory of each joint and CoG in response to the established start and end times is formed at operation S20.

Next, the controller 210 calculates a value of the objective function having a limited condition. The objective function having the limited condition is the following Equation 11.

$$\min_{P_{CoG},q} (-w_1 J_{performance} + w_2 J_{velocity} + w_3 J_{torque} + w_4 J_{balance}) = J_{min} \quad \text{[Equation 11]}$$

In Equation 11, $J_{performance}$ is used as a substantial objective function, and $J_{velocity}$, $J_{torque}$ or $J_{balance}$ is used as a limited condition of the substantial objective function at operation S30.

Next, the controller 210 determines whether or not a convergence condition of a routine of calculating the objective function is satisfied. If a value of the objective function having the limited condition is different from an old objective function value having been calculated from the previous routine by a predetermined value or less, the convergence condition is satisfied at operation S40.

Next, if the convergence condition of the calculation routine of the objective function is satisfied at operation S40, the controller 210 recognizes the start and end times ($t_0$) and ($t_f$), each of which causes the objective function having the limited function to be minimized at operation S50.

Next, the controller 210 determines a trajectory formed by the start time ($t_0$) and the end time ($t_f$) at which the objective function having the limited condition is minimized to be a velocity profile of each joint and CoG needed for a motion at operation S60.

In the meantime, if the convergence condition is not satisfied at operation S40, the controller 210 returns to operation S20, so that the trajectory based on another initial value is formed and the objective function value is calculated at operation S30.

As is apparent from the above description, the robot and the method of controlling the same according to at least one embodiment can maximally utilize the actuator specification of the robot, and can derive a maximum dynamic capability of the robot in consideration of dynamics.

Although at least one embodiment has been shown and described, it would be appreciated by those skilled in the art that changes may be made in the at least one embodiment without departing from the principles and spirit of the invention, the scope of which is defined in the claims and their equivalents.

What is claimed is:

1. A method of controlling a robot, the method comprising:
forming a first bell-shaped velocity profile according to a start time and an end time of a motion of a joint of the robot;
calculating a value of an objective function having a limited condition according to the first bell-shaped velocity profile; and
driving the joint of the robot in response to a second bell-shaped velocity profile that minimizes the objective function having the limited condition,
wherein the forming of the first bell-shaped velocity profile in response to the start time and the end time of the motion includes:
forming a trajectory of a center of gravity of the robot,
wherein the limited condition includes a velocity of a joint, a torque of the joint, and a Zero Momentum Point (ZMP) of the robot.

2. The method according to claim 1, wherein the forming of the first bell-shaped velocity profile in response to the start time and the end time of the motion includes:
forming a trajectory of a joint needed for motion of the robot.

3. The method according to claim 2, wherein the trajectory includes information of a joint angle, a joint velocity, and a joint acceleration needed to perform the motion.

4. The method according to claim 1,
wherein the objective function having the limited condition recognizes a value ($J_{min}$) using the following Equation:

$$\min_{P_{CoG},q} (-w_1 J_{performance} + w_2 J_{velocity} + w_3 J_{torque} + w_4 J_{balance}) = J_{min} \quad \text{[Equation]}$$

where $J_{peformance}$ is a value of an objective function to maximize a velocity of an end effector of the robot, $J_{velocity}$ is a value of an objective function to limit the velocity of the joint used in the motion, $J_{torque}$ is a value of an objective function to limit the torque of the joint, $J_{balance}$ is a value of an objective function to limit the Zero Momentum Point (ZMP) of the robot within a specific range, $w_1$, $w_2$, $w_3$, or $w_4$ is a constant, PCoG is a position of the overall center of gravity of the robot, and q is an angle of the joint.

5. The method according to claim 1, wherein the bell-shaped velocity profiles represent a variation of velocity with time of a robot profile.

6. The method according to claim 1, wherein the forming of the first bell-shaped velocity profile according to the start time and the end time of the motion of a joint of the robot includes:
forming a plurality of initial bell-shaped velocity profiles according to certain start times and certain end times of the motions of a plurality of joints of the robot.

7. The method according to claim 6, wherein the calculating of the value of the objective function having the limited condition according to the first bell-shaped velocity profile includes:
repeatedly calculating the value of the objective function having the limited condition in response to the initial bell-shaped velocity profiles.

8. The method according to claim 1, wherein the second bell-shaped velocity profile is determined by determining a start time and an end time at which the objective function having the limited condition is minimized.

9. The method according to claim 8, wherein a trajectory is formed by the start time and the end time at which the objective function having the limited condition is minimized, and the trajectory is determined to be the second bell-shaped velocity profile.

10. A robot, comprising:
an input unit to receive a motion command of a robot; and
a controller to form a first bell-shaped velocity profile according to a start time and an end time of a motion of a joint of the robot and to calculate a value of an objective function having a limited condition according to the first bell-shaped velocity profile; and
a driver to drive the joint of the robot in response to a specific second bell-shaped velocity profile that minimizes the objective function having the limited condition,
wherein the controller forms a trajectory of a center of gravity of the robot,
wherein the limited condition includes a velocity of a joint, a torque of the joint, and a Zero Momentum Point (ZMP) of the robot.

11. The robot according to claim 10, wherein the controller forms a trajectory of a joint needed for motion of the robot.

12. The robot according to claim 10, wherein the controller recognizes a value ($J_{min}$) of the objective function having the limited condition using the following Equation:

$$\min_{P_{CoG},q} (-w_1 J_{performance} + w_2 J_{velocity} + w_3 J_{torque} + w_4 J_{balance}) = J_{min}$$ [Equation]

where $J_{performance}$ is a value of an objective function to maximize a velocity of an end effector of the robot, $J_{velocity}$ is a value of an objective function to limit the velocity of the joint, used in the motion, $J_{torque}$ is a value of an objective function to limit the torque of the joint, $J_{balance}$ is a value of an objective function to limit the Zero Momentum Point (ZMP) of the robot within a specific range, $w_1$, $w_2$, $w_3$, or $w_4$ is a constant, PCoG is a position of an overall center of gravity of the robot, and q is an angle of the joint.

13. The robot according to claim 10, wherein the controller forms a plurality of initial bell-shaped velocity profiles according to certain start times and certain end times of the motions of a plurality of joints of the robot.

14. The robot according to claim 13, wherein the controller calculates the value of the objective function having the limited condition according to the initial bell-shaped velocity profiles, and drives a joint in response to a specific second bell-shaped velocity profile that minimizes the value of the objective function.

15. The robot according to claim 13, wherein the controller drives each joint or the center of gravity needed for the motion in response to the second bell-shaped velocity profile that minimizes the value of the objective function.

16. The robot according to claim 10, wherein the controller arbitrarily determines the start time and the end time of the motion, and forms an initial bell-shaped profile of either a joint needed for the motion or a center of gravity of the robot.

17. The robot according to claim 10, wherein controller determines the second bell-shaped velocity profile by determining a start time and an end time at which the objective function having the limited condition is minimized.

18. The robot according to claim 17, wherein a trajectory is formed by the start time and the end time at which the objective function having the limited condition is minimized, and the trajectory is determined to be the second bell-shaped velocity profile.

19. The robot according to claim 10, wherein the controller includes a command interpreter to interpret the received motion command, and a command generator connected to the command interpreter to generate a motion command.

20. A method of controlling a robot, the method comprising:
forming a plurality of first bell-shaped velocity profiles corresponding to a start time and an end time of motions of a plurality of joints of the robot;
calculating a value of an objective function having a limited condition according to the first bell-shaped velocity profile;
optimizing a plurality of second bell-shaped velocity profiles to minimize the objective function having the limited condition and to perform a dynamic motion of the robot, which includes moving the plurality of joints, based on the plurality of first bell-shaped velocity profiles; and
driving the plurality of joints of the robot in response to the plurality of second bell-shaped velocity profiles that minimize an objective function having a limited condition,
wherein the forming a plurality of the first bell-shaped velocity profiles corresponding to the start time and the end time of the motions of the plurality of joints of the robot includes:
forming a trajectory of a center of gravity of the robot,
wherein the limited condition includes a velocity of a joint, a torque of the joint, and a Zero Momentum Point (ZMP) of the robot.

* * * * *